(12) United States Patent
Mok

(10) Patent No.: US 7,614,618 B2
(45) Date of Patent: Nov. 10, 2009

(54) CUTTING BOARD SYSTEM

(75) Inventor: Albert Mok, Shaukeiwan (HK)

(73) Assignee: Lexington Limited, Shaukeiwan (HK)

( * ) Notice: Subject to any disclaimer, the term of this patent is extended or adjusted under 35 U.S.C. 154(b) by 904 days.

(21) Appl. No.: 10/834,991

(22) Filed: Apr. 30, 2004

(65) Prior Publication Data

US 2004/0217533 A1 Nov. 4, 2004

(30) Foreign Application Priority Data

May 2, 2003 (CN) .................................. 03251559

(51) Int. Cl.
*B23Q 3/00* (2006.01)
(52) U.S. Cl. ................. 269/289 R; 269/302.1
(58) Field of Classification Search ............. 269/284 R, 269/302.1; 402/63, 1, 2
See application file for complete search history.

(56) References Cited

U.S. PATENT DOCUMENTS 4,991,990 A * 2/1991 Frank et al. ................... 402/53
5,242,522 A * 9/1993 Moir ............................ 40/776
6,004,061 A * 12/1999 Manico et al. ................. 402/79

* cited by examiner

*Primary Examiner*—Lee D Wilson
(74) *Attorney, Agent, or Firm*—Rabin & Berdo, P.C.

(57) ABSTRACT

This invention discloses a combined chopping board including a main chopping board and several additional chopping boards, the main chopping board and additional chopping boards are connected by means of a movable connection structure. The movable connection structure includes a hole stopper consisting of a head part and a neck part, this neck part is inserted in the through hole of the main chopping board across the through hole of the additional chopping board to fix the additional chopping board on the main chopping board; it can fulfill the need to use many chopping boards by the same user and can be selected according to the specific properties of the food, such as uncooked or cooked, the hardness of cutting through, and so on. The boards can be replaced and cleaned conveniently and the storage room can be saved with many chopping boards folding to an integral.

12 Claims, 3 Drawing Sheets

CUTTING BOARD SYSTEM

BACKGROUND OF THE INVENTION

This invention relates to a kind of kitchen utensils, especially a chopping board used for cutting through the food.

The products of chopping board now available are various, but taking one with another, if not considering the used material and the exterior decoration and design, the chopping boards of which the structures being fundamentally the same are something like a board having definite thickness. In practical life, the food to be cut through are of various kinds, in terms of hardness of cutting through, they can be divided into the food easy to cut through and the food relatively hard to cut through at least, the former is like vegetables, fruits, the latter is like the meat with bones, and the thin chopping board is suitable for the food easy to cut through, but the relatively thick chopping board is needed for the food relatively hard to cut through, otherwise the mat or kitchen table under the chopping board would be very easy to break while being forcibly cut through or hewed on; on the other hand, in terms of the health, the different chopping boards should be used for cutting through the uncooked and cooked food respectively. Therefore, as the life quality required by people is continuously improving, there is nothing surprising that the need for using two or more chopping boards exists even in common families. With the products now available, it means that each family needs to purchase several separate chopping boards. This will not only increase the expenses, but also entail problems of storage and use of these separate chopping boards.

SUMMARY OF THE INVENTION

The purpose of this invention is to provide a new chopping board which can overcome the above mentioned shortcomings of the products now available.

For achieving the above mentioned purpose, the solution is to provide a kind of combined chopping board including a main chopping board and several additional chopping boards, the main chopping board and additional chopping boards are connected through a movable connection structure. The additional chopping board is put on the main chopping board, identical shaped through holes are set at the correspongding positions of the main chopping board and additional chopping boards respectively; this movable connection structure includes a hole stopper, this hole stopper includes a head part and a neck part, the shape of the cross section of the neck part is identical to the shapes of the through holes in the main chopping board and additional chopping board, this neck part is inserted into the through hole of the main chopping board across the through hole in the additional chopping board and thus the additional chopping board is fixed on the main chopping board; the cross section of the neck part of the hole stopper, the through hole of main chopping board and the additional chopping board are of ellipse or circle or rectangle or triangle; the matched projecting streak and the groove are set on of the neck part of hole stopper and the wall of through hole of main chopping board; at least two projecting column of the equal height are set on the main chopping board; the corresponding structure matched with this projecting column is set on the additional chopping board; the total thickness of the additional chopping boards is smaller than the height of the projecting column; this movable connection structure is of thread connection; the thickness of this main chopping board is larger than the thickness of the additional chopping board; at least two additional chopping boards are included, their width is identical to that of the main chopping board, the length of the nearest and the farthest ones from the main chopping board is identical to that of the main chopping board, and the lengths of other chopping boards decrease sequentially. The main chopping board and the additional chopping board are made of polyethylene or polypropylene, the thickness of the main chopping board is 1.2 cm, the thickness of the additional chopping board is 0.8 mm, the height of the projecting column is 3.2 mm and above.

Due to the resolution above mentioned, this invention includes both the relatively thick main chopping board suitable for the food relatively hard to cut through and the several relatively thin additional chopping boards suitable for the food easy to cut through. With two objects connected by means of the movable connection structure the product according to the invention has both the integrity and the features of easy use and flexible change, both fulfills the functions of various chopping boards and saves the storage room.

DESCRIPTION OF THE PREFERRED EMBODIMENT

Figure 1:
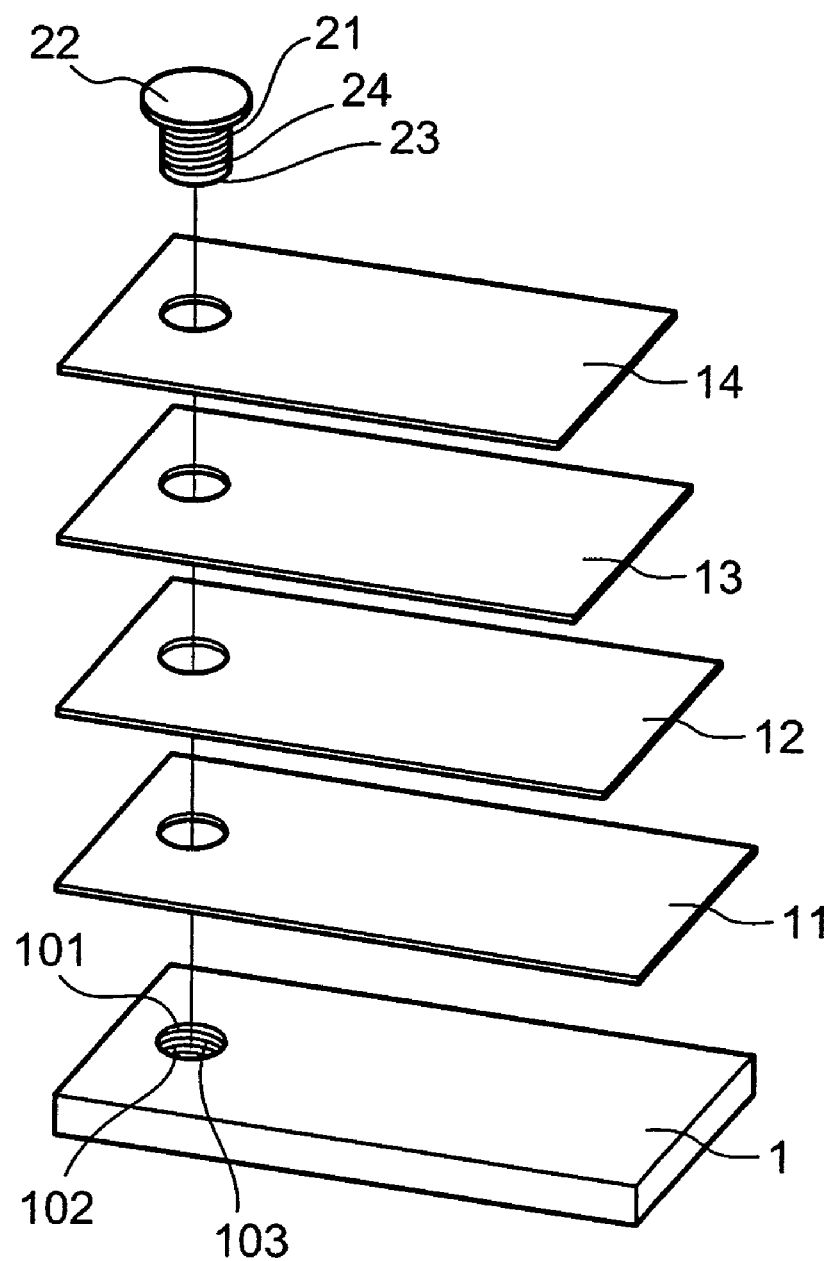
FIG. 1 is the exploded view of the first embodiment of this invention.

Please refer to FIG. 1, the exploded view of the first embodiment of this invention. This combined chopping board includes a main chopping board 1 and the first additional chopping board 11, the second additional chopping board 12, the third additional chopping board 13, the fourth additional chopping board 14 and the hole stopper 2, this hole stopper 2 includes the head part 22 and the neck part 21, the projecting streak 24 and the groove 23 are set on this neck part 21, the through hole 101 is set in this main chopping board 1, the shape of the through hole 101 is identical to that of the cross section of the neck part 21 of the hole stopper 2, the projecting streak 102 and the groove 103 which are matched with the projecting streak and the groove on the neck part 21 of the hole stopper 2 are set on the wall of the through hole 101, the shape of four additional chopping boards is identical to that of the main chopping board 1, and the through holes are respectively set in the corresponding position thereof, four additional chopping boards are stacked on the main chopping board 1 according to the corresponding position of the through holes, then the hole stopper 2 is inserted in the through hole 101 of the main chopping board 1 across the through holes of four additional chopping boards, and each additional chopping board is fixed on the main chopping board 1. The neck part 21 of the hole stopper 2 is connected to the wall of through hole 101 of the main chopping board 1 by means of the matched projecting streak and the groove.

The additional chopping board can be taken out for cleaning or changing by pulling out the hole stopper, the width of four additional chopping boards is identical to that of the main chopping board 1, the first additional chopping board 11, the nearest one, borders upon the main chopping board 1, its length is essentially identical to that of the main chopping board; the lengths of the second, the third, the fourth additional chopping board decrease sequentially, for instance, decrease of 1~2 cm each time, on the other side, it can be that the length of the fourth additional chopping board which is farthest from the main chopping board 1 is identical to that of the main chopping board, and the lengths of the third, the second, the first additional chopping board decrease sequentially, of course, it is possible that the shapes and sizes of four additional chopping boards are all identical to that of the main chopping board 1.

Figure 2:
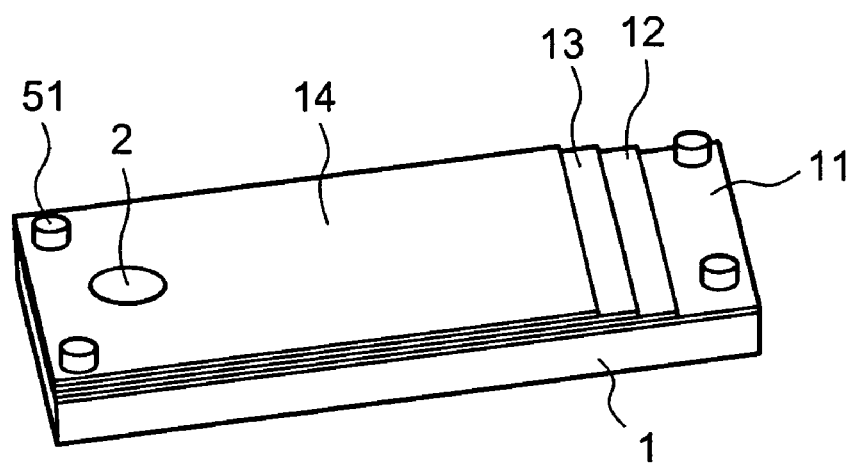
FIG. 2 is the solid schematic diagram of the second embodiment of this invention.
Figure 3:
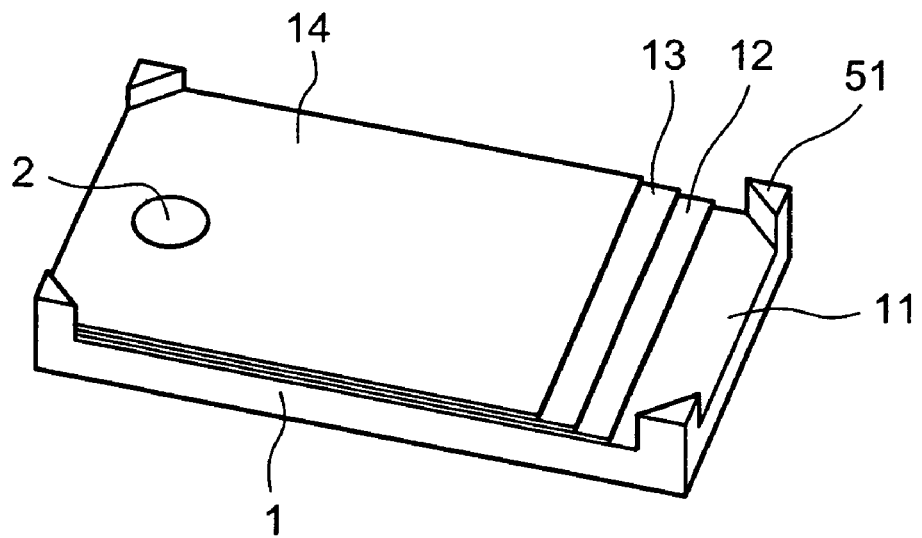
FIG. 3 is the solid schematic diagram of the third embodiment of this invention.

Please refer to FIG. 2, the difference between this embodiment and the first one is: projecting columns 51 of equal height are set on four corners of this main chopping board 1 respectively. The total thickness of all the additional chopping boards should smaller than the height of projecting column 51, the effect of the projecting column 51 is to provide a supporting point while the main chopping board 1 is used in its turn-over position, and pad the chopping board to avoid the contamination caused by direct contact between the chopping board and the mat or the kitchen table. To coordinate with this projecting column, the through holes, of which the shape are identical to that of cross section of the projecting column, are set on the corresponding position of the additional chopping board respectively. Of course, in accordance with the principle of "three points define a plane" in geometry, it can also be that three or more projecting columns of equal height are set on other positions. The cross section of this projecting column can be any geometrical shape, furthermore it can just be a projecting object which is suitable for padding the chopping board while in turn-over position, for instance, a triangular projecting column extending immediately along four pointed corners of the main chopping board. Under this circumstance, the additional chopping board can be shaped as one lacking a triangle at corresponding position to coordinate with the main chopping board 1, as shown in FIG. 3.

Figure 4:
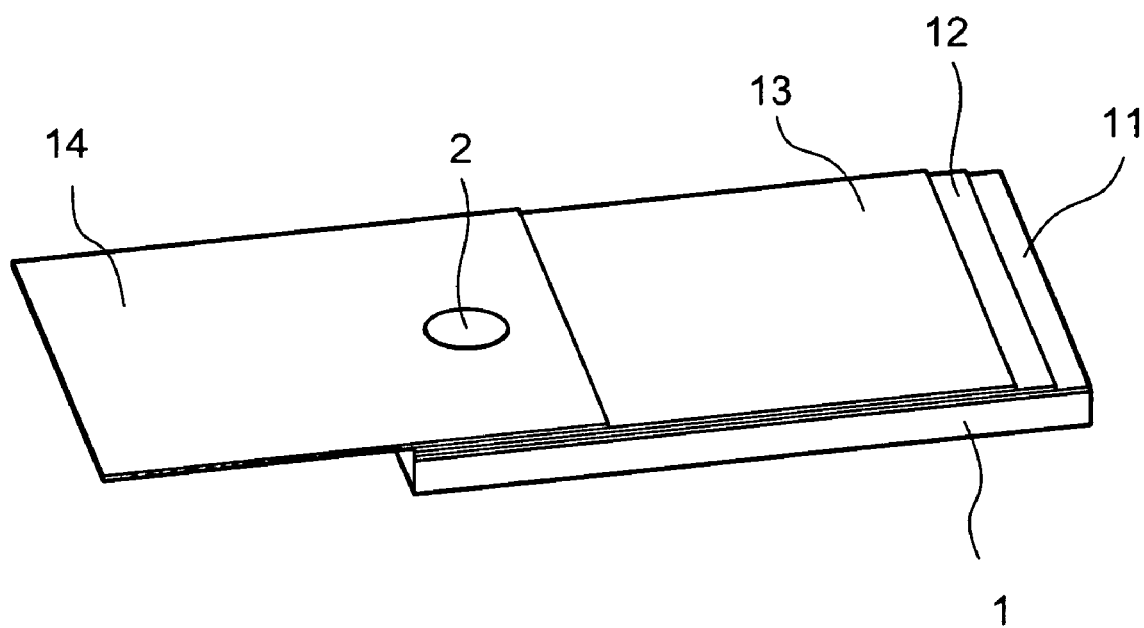
FIG. 4 is a kind of using situation and the solid schematic diagram of the fourth embodiment of this invention.

According to this invention, the through hole of main chopping board 1 and each additional chopping board and the cross section of the neck part 21 of the hole stopper 2 can be designed in different shapes, for instance, the ellipse, circle, triangle and rectangle. Under the circumstance of adopting circular shape and leaving suitable space between the bottom of the head part of the hole stopper and the bordering additional chopping board, each additional chopping board can be rotated 360° freely about this hole stopper, the advantage brought by this is: if the main chopping board 1 is used first, all the additional chopping boards can be rotated 180° to the other side, and later if any particular chopping board is needed to be used, it can be rotated another 180° to be placed above the main chopping board 1 for using; if any additional chopping board is used first, the other additional chopping boards, if any, which are put on it, can be rotated 180° to the other side first, as shown in FIG. 4, and the corresponding rotation can be performed later if another chopping board is to be used, namely, by rotating additional chopping boards can the chopping boards be changed flexibly to adapt various use without taking off the additional chopping board by pulling out the hole stopper 2.

The main chopping board 1 and each additional chopping board are connected by means of a movable connection structure, the above embodiments show the fitting mode between the through hole and the hole stopper with projecting streak and groove, in fact, any other fitting mode between the through hole and the hole stopper without projecting streak and groove, or thread connection can also be adopted, if only additional chopping boards can be fixed on the main chopping board with easy assembling/disassembling and flexible changing.

Besides, it is also possible to adopt other movable connection structures, for instance, to adopt the movable connection similar to the embodiment as shown in FIG. 2: the projecting column 51 is set on the main chopping board, the through hole which has the same shape as the cross section of this projecting column is set on the corresponding position of each additional chopping board, the additional chopping board can be fixed on the main chopping board by inserting the projecting column in the through hole. Generally speaking, a better fixing effect will be achieved by adopting more than one projecting column and undet this circumstance there is no need to use the hole stopper for fixing, this projecting column can have projecting streak and groove, or even surface, or even the thread, its cross section can be all kinds of shapes, for instance, circle, ellipse, triangle, rectangle and etc., if only it can be fitted with the through hole of the additional chopping board and fix the additional chopping board on the main chopping board. This projecting column generally can be set on the edge or the corner of the main chopping board; the amount can be one or more.

Also, it is possible to connect the main chopping board and the additional chopping board by means of such movable connection mode as snatch connection, thread connection, which are easy to assemble and disassemble.

In above mentioned embodiments, the main chopping board 1 and each additional chopping board are rectangle, but in reality the other arbitrary shapes and different materials for production can be selected. If polyethylene or polypropylene is adopted, the following can be selected: the thickness of the main chopping board is about 1.2 cm, each additional chopping board is about 0.8 mm, the height of the projecting column 51 is about 3.2 mm. All of these are the examples and explanations aimed at the illustration of specific embodiments, but not the restriction on the invention.

What is claimed is:

1. A combined chopping board, comprising a main chopping board and an additional chopping board, the main chopping board and the additional chopping board being connected by means of a movable connection structure, wherein at least one of the main chopping board and the additional chopping board comprises a material selected from the group consisting of polyethylene and polypropylene.

2. A combined chopping board according to claim 1, wherein the additional chopping board is disposed on the main chopping board, through holes of identical shape are provided at corresponding positions of the main chopping board and the additional chopping board respectively; the movable connection structure includes a hole stopper, the hole stopper includes a head part and a neck part, a shape of a cross section of the neck part is identical to that of the through hole of the additional chopping board, and the neck part is inserted in the through hole of the main chopping board via the through hole of the additional chopping board to fix the additional chopping board on the main chopping board.

3. A combined chopping board according to claim 2, wherein a cross section of the neck part of the hole stopper, through holes of the main chopping board and the additional chopping board is an ellipse or circle or rectangle or triangle.

4. A combined chopping board according to claim 2, wherein a first projection and a first groove are provided on walls of the neck part of the hole stopper and a matching second projection and a matching second groove are provided in the through hole of the main chopping board.

5. A combined chopping board according to claim 4, wherein said projections and said grooves provided on each of said hole stopper and said through hole constitute helical threads.

6. A combined chopping board, comprising a main chopping board and an additional chopping board, the main chopping board and the additional chopping board being connected by means of a movable connection structure, wherein the thickness of the main chopping board is substantially 1.2 cm, and the thickness of the additional chopping board is substantially 0.8 mm.

7. A combined chopping board according to claim 6, wherein the additional chopping board is disposed on the main chopping board, through holes of identical shape are provided at corresponding positions of the main chopping board and the additional chopping board respectively; the movable connection structure includes a hole stopper, the hole stopper includes a head part and a neck part, a shape of a cross section of the neck part is identical to that of the through hole of the additional chopping board, and the neck part is inserted in the through hole of the main chopping board via the through hole of the additional chopping board to fix the additional chopping board on the main chopping board.

8. A combined chopping board according to claim 7, wherein a cross section of the neck part of the hole stopper, through holes of the main chopping board and the additional chopping board is an ellipse or circle or rectangle or triangle.

9. A combined chopping board according to claim 7, wherein a first projection and a first groove are provided on walls of the neck part of the hole stopper and a matching second projection and a matching second groove are provided in the through hole of the main chopping board.

10. A combined chopping board according to claim 9, wherein the first projection and the first groove, as well as the matching second projection and the matching second groove, are configured as helical threads.

11. A combined chopping board, comprising a main chopping board and an additional chopping board, the main chopping board and the additional chopping board being connected by means of a movable connection structure, wherein the additional chopping board is disposed on the main chopping board, through holes of identical shape are provided at corresponding positions of the main chopping board and the additional chopping board respectively; the movable connection structure includes a hole stopper, the hole stopper includes a head part and a neck part, a shape of a cross section of the neck part is identical to that of the through hole of the additional chopping board, and the neck part is inserted in the through hole of the main chopping board via the through hole of the additional chopping board to fix the additional chopping board on the main chopping board, wherein a first projection and a first groove are provided on walls of the neck part of the hole stopper and a matching second projection and a matching second groove are provided in the through hole of the main chopping board.

12. A combined chopping board according to claim 11, wherein said projections and said grooves provided on each of said hole stopper and said through hole constitute helical threads.

* * * * *